United States Patent
Prabhune et al.

(10) Patent No.: US 8,831,197 B2
(45) Date of Patent: Sep. 9, 2014

(54) ONE BUTTON CONFERENCE INITIATION

(75) Inventors: Satyavrat A. Prabhune, San Jose, CA (US); Krutarth M. Shah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 1491 days.

(21) Appl. No.: 12/048,724

(22) Filed: Mar. 14, 2008

(65) Prior Publication Data

US 2009/0232291 A1   Sep. 17, 2009

(51) Int. Cl.
| | |
|---|---|
| *H04M 3/42* | (2006.01) |
| *H04M 1/00* | (2006.01) |
| *H04M 11/00* | (2006.01) |
| *H04N 7/14* | (2006.01) |
| *H04L 12/16* | (2006.01) |
| *H04Q 11/00* | (2006.01) |
| *H04L 12/18* | (2006.01) |
| *H04M 3/56* | (2006.01) |

(52) U.S. Cl.
CPC ............. *H04M 3/56* (2013.01); *H04L 12/1818* (2013.01)
USPC ................... 379/202.01; 379/93.21; 379/158; 370/260; 455/416; 348/14.08

(58) Field of Classification Search
USPC ........... 379/202.01, 90.01, 93.01, 93.21, 157, 379/158, 201.01, 207.01; 370/259, 260, 370/261, 262; 455/414.1, 416; 348/14.01, 348/14.02, 14.03, 14.04, 14.05, 14.06, 348/14.08, 14.09, 14.1, 14.11, 14.12, 14.13, 348/14.14, 15.15, 14.16
See application file for complete search history.

(56) References Cited

U.S. PATENT DOCUMENTS

| | | | |
|---|---|---|---|
| 5,408,526 A | 4/1995 | McFarland et al. | 379/202 |
| 5,544,237 A | 8/1996 | Bales et al. | 379/205 |
| 5,781,731 A | 7/1998 | Koreeda et al. | |
| 5,812,652 A | 9/1998 | Jodoin et al. | |
| 5,835,718 A * | 11/1998 | Blewett | 709/218 |
| 5,884,039 A | 3/1999 | Ludwig et al. | 395/200 |
| 6,035,036 A | 3/2000 | Eisenbraun et al. | 379/446 |
| 6,374,102 B1 | 4/2002 | Brachman et al. | 455/422 |
| 6,731,732 B2 | 5/2004 | Creamer et al. | 379/201.03 |
| 6,760,423 B1 | 7/2004 | Todd | 379/202.01 |

(Continued)

OTHER PUBLICATIONS

Kalipatnapu, et al., *Establishing a Remotely Hosted Conference Initiated with One Button Push*, U.S. Appl. No. 12/050,581, filed Mar. 18, 2008, Mar. 14, 2008.

(Continued)

*Primary Examiner* — Khai N Nguyen
(74) *Attorney, Agent, or Firm* — Baker Botts L.L.P.

(57) ABSTRACT

A method includes receiving at a local conference coordinator a first indication of a scheduled conference that includes a plurality of conference details. The method also includes transmitting at least one of the plurality of conference details to a remote conference coordinator and receiving at least one additional conference detail regarding the scheduled conference from the remote conference coordinator. The method additionally includes determining conference scheduling information comprising at least one resource to be used for the scheduled conference based on the plurality of conference details and the at least one additional conference detail. The method also includes identifying a conference room supporting the at least one resource to be used for the scheduled conference. The method further includes transmitting conference scheduling information to the conference room such that an interface in the conference room can initiate the scheduled conference based on a single indication received from a user.

17 Claims, 3 Drawing Sheets

(56) References Cited

U.S. PATENT DOCUMENTS

| | | |
|---|---|---|
| 6,771,766 B1 | 8/2004 | Shafiee et al. |
| 6,801,604 B2 | 10/2004 | Maes et al. |
| 6,870,916 B2 | 3/2005 | Henrikson et al. ....... 379/202.01 |
| 6,941,349 B2 | 9/2005 | Godfrey et al. .............. 709/207 |
| 7,051,049 B2 * | 5/2006 | Samn ................................... 1/1 |
| 7,054,918 B2 | 5/2006 | Polcyn .......................... 709/217 |
| 7,152,093 B2 | 12/2006 | Ludwig et al. ................ 709/204 |
| 7,206,809 B2 | 4/2007 | Ludwig et al. ................ 709/204 |
| 7,233,589 B2 | 6/2007 | Tanigawa et al. |
| 7,593,354 B2 | 9/2009 | Surin et al. |
| 7,593,520 B1 | 9/2009 | Croak et al. |
| 7,773,581 B2 | 8/2010 | Punj et al. |
| 2001/0014866 A1 | 8/2001 | Commy ........................... 705/9 |
| 2002/0123895 A1 | 9/2002 | Potekhin et al. |
| 2002/0184373 A1 | 12/2002 | Maes |
| 2003/0058806 A1 | 3/2003 | Meyerson et al. ............ 370/260 |
| 2003/0088421 A1 | 5/2003 | Maes et al. |
| 2004/0001446 A1 | 1/2004 | Bhatia et al. .................. 370/261 |
| 2004/0064355 A1 | 4/2004 | Dorenbosch et al. ............ 705/9 |
| 2004/0107255 A1 | 6/2004 | Ludwig et al. ................ 709/204 |
| 2004/0125933 A1 * | 7/2004 | Jun et al. .................. 379/202.01 |
| 2004/0240650 A1 | 12/2004 | Bear et al. ...................... 379/142 |
| 2005/0002514 A1 | 1/2005 | Shafiee et al. |
| 2005/0008024 A1 | 1/2005 | Newpol et al. |
| 2005/0041646 A1 | 2/2005 | Punj et al. |
| 2005/0078171 A1 | 4/2005 | Firestone et al. |
| 2005/0094621 A1 | 5/2005 | Acharya et al. |
| 2005/0181872 A1 | 8/2005 | Acharya et al. |
| 2005/0237931 A1 | 10/2005 | Punj et al. |
| 2005/0237952 A1 | 10/2005 | Punj et al. |
| 2005/0267975 A1 | 12/2005 | Qureshi et al. |
| 2006/0015376 A1 | 1/2006 | Sattler et al. ....................... 705/5 |
| 2006/0023062 A1 | 2/2006 | Elbaze et al. |
| 2006/0026002 A1 | 2/2006 | Potekhin et al. |
| 2006/0045030 A1 * | 3/2006 | Bieselin ........................ 370/260 |
| 2006/0045253 A1 * | 3/2006 | Bieselin et al. ........... 379/202.01 |
| 2006/0062367 A1 * | 3/2006 | Christenson et al. .... 379/202.01 |
| 2006/0088152 A1 | 4/2006 | Green et al. ................... 379/202 |
| 2007/0124377 A1 | 5/2007 | Schmidt et al. |
| 2007/0171898 A1 | 7/2007 | Salva |
| 2007/0180029 A1 | 8/2007 | Croak et al. |
| 2007/0223675 A1 | 9/2007 | Surin et al. |
| 2007/0263825 A1 | 11/2007 | Shah et al. .............. 379/202.01 |
| 2007/0285503 A1 | 12/2007 | Asthana et al. |
| 2007/0291108 A1 | 12/2007 | Huber et al. |
| 2007/0291667 A1 | 12/2007 | Huber et al. |
| 2008/0046514 A1 * | 2/2008 | Daughtry et al. ............. 709/204 |
| 2008/0063173 A1 | 3/2008 | Sarkar et al. |
| 2008/0120381 A1 | 5/2008 | Awan et al. |
| 2008/0165944 A1 * | 7/2008 | Rosenthal et al. ....... 379/202.01 |
| 2009/0043627 A1 | 2/2009 | Vaidya et al. ...................... 705/8 |
| 2009/0044132 A1 | 2/2009 | Combel et al. |
| 2009/0298587 A1 | 12/2009 | Acharya et al. |
| 2009/0323561 A1 | 12/2009 | Croak et al. |

OTHER PUBLICATIONS

Kalipatnapu et al., U.S. Appl. No. 12/050,581, filed Mar. 18, 2008 entitled *Establishing a Remotely Hosted Conference Initiated with One Button Push*.

PCT Notification of Transmittal of the International Search Report and the Written Opinion of the ISA, or the Declaration for PCT/US 2007/09507; ISA/US; mailed Aug. 21, 2008.

Shah et al., U.S. Appl. No. 11/483,815, filed Jul. 10, 2006 Communication from the United States Patent and Trademark Office dated Aug. 12, 2008.

Shah et al., U.S. Appl. No. 11/483,815, filed Jul. 10, 2006 Communication from the United States Patent and Trademark Office dated Feb. 26, 2009.

Shah et al., U.S. Appl. No. 11/483,815, filed Jul. 10, 2006, *Accessing a Calendar Server to Facilitate Initiation of a Scheduled Call*, Communication from the United States Patent and Trademark Office dated Sep. 8, 2009.

Kalipatnapu et al., U.S. Appl. No. 12/050,581, *Establishing a Remotely Hosted Conference Initiated with One Button Push*, communication from the U.S. Patent and Trademark Office mailed Apr. 6, 2010.

Kalipatnapu et al., U.S. Appl. No. 12/050,581, *Establishing a Remotely Hosted Conference Initiated with One Button Push*, communication from the U.S. Patent and Trademark Office mailed Sep. 23, 2010.

Kalipatnapu et al., U.S. Appl. No. 12/050,581, Non-final Office Action communication from the U.S. Patent and Trademark Office mailed Jan. 18, 2011.

The First Office Action from State Intellectual Property Office of the People's Republic of China dated Jan. 19, 2011, in regard to Application No. 200780013980.7.

Office Action Summary issued by the USPTO for U.S. Appl. No. 12/050,581, filed Mar. 18, 2008 for inventor Rajah K.V.R. Kalipatnapu, Aug. 12, 2011.

Response to Office Action Summary issued by the USPTO dated Aug. 12, 2011 for U.S. Appl. No. 12/050,581, Nov. 14, 2011.

* cited by examiner

ONE BUTTON CONFERENCE INITIATION

TECHNICAL FIELD

This invention relates generally to the field of telecommunications and more specifically to one button conference initiation.

BACKGROUND

As technology evolves and develops, users are presented with an ever increasing selection of options and features. Unfortunately, this increase in selection and features is often accompanied by an increase in complexity. This complexity increase is not limited to the "behind the scenes" complexity involved in making the features or options work, but is often present in the user interface. In order to take advantage of the new features and options the user may have to make several decisions about what features they want and how they want them to be implemented.

One area in which this is particularly prevalent is in various types of conferencing solutions. Not only does the user need to know the phone number of the other party, or the "call-in" number for conference, but they may also have to know a conference ID number, a log-in ID and one or more passwords. In addition, just because their device supports a particular feature does not mean that the other party's device is able to support that feature or that the feature will be automatically enabled upon the start of the conference. The complexity of conferencing systems, especially video conferencing systems, can be seen by the need for information technology (IT) personnel to setup the various components needed for each video conference.

BRIEF DESCRIPTION OF THE DRAWINGS

For a more complete understanding of particular embodiments and their features and advantages, reference is now made to the following description, taken in conjunction with the accompanying drawings, in which.

DESCRIPTION

Overview:

In accordance with particular embodiments, a method includes receiving at a local conference coordinator a first indication of a scheduled conference. The first indication includes a plurality of conference details. The method also includes transmitting at least one of the plurality of conference details to a remote conference coordinator. The method further includes receiving at least one additional conference detail regarding the scheduled conference from the remote conference coordinator. The method additionally includes determining conference scheduling information comprising at least one resource to be used for the scheduled conference based on the plurality of conference details and the at least one additional conference detail. The method also includes identifying a conference room supporting the at least one resource to be used for the scheduled conference. The method further includes transmitting conference scheduling information to the conference room such that an interface in the conference room can initiate the scheduled conference based on a single indication received from a user.

Description of Example Embodiments

Figure 1:
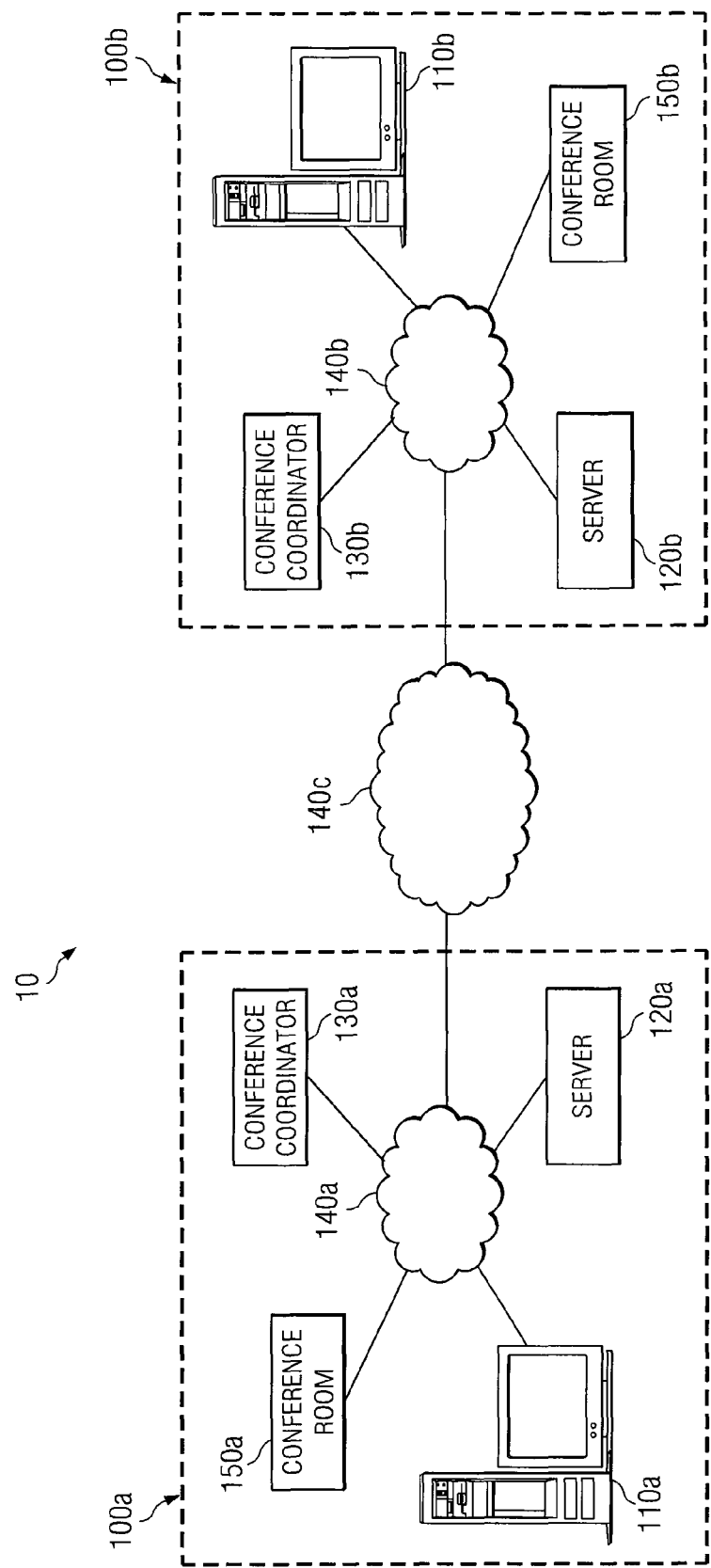
FIG. 1 is a block diagram illustrating a system for videoconferencing between sites, in accordance with some embodiments.

FIG. 1 is a block diagram illustrating a system 10 for videoconferencing between locations 100a and 100b. The illustrated embodiment includes computers 110, calendar/messaging server 120, conference coordinators 130, networks 140, and conference rooms 150. More specifically, computer 110a, server 120a, conference coordinator 130a, and conference room 150a of site 100a are coupled together by network 140a and computer 110b, server 120b, conference coordinator 130b, and conference room 150b of site 100b are coupled together by network 140b. Additionally, network 140c couples locations 100a and 100b to facilitate in preparing, initiating, and conducting a conference. These components may allow a user to schedule a conference by simply using computer 110a to identify such information as the desired attendees, time of the conference and/or the conference room. This information may be distributed to, and processed by, servers 120a and 120b, and conference coordinators 130a and 130b. This distribution/processing may allow conference coordinators 130 to synchronize the conference details and then push any necessary information to the respective conference rooms 150. The necessary information may then allow the user to enter the appropriate conference room 150 at the desired time and press a single button on a device (e.g., a conference initiator) to initiate the conference with the desired attendees.

Examining these components in detail, locations 100 may represent different companies, enterprise networks, office sites, or any other type of location or topology that may separate networks 140. For example, site 100a may be a company's California office and site 100b may be the company's Texas office. As another example, site 100a may be a first company's office and site 100b may be a second company's office. As yet another example, site 100a may be a first room within a building and site 100b may be a second room within the building. Just as the physical location of sites 100 may vary, so may the various components within sites 100.

Computers 110 may include any combination of hardware, software, and/or encoded logic operable to provide a user with an interface through which he may schedule a conference with other users. For example, computer 110a may be a PC with a calendaring program installed thereon. The user may use the calendaring program, or an interface to conferencing coordinator 130, to schedule a conference with other users. The other users may be selected from a contact list, entered manually, or otherwise inputted or loaded into a calendar event created for the conference being scheduled. The other users, or participants, may be local to, or remote from, the user scheduling the conference.

Servers 120 may be any type of business message platform operable to maintain and/or organize email, files, task lists, and/or calendar and contact information (collectively, "messaging data"). Thus, servers 120 may allow email, files and other data to be accessed at any time from a single device. For example, if site 100a is a business and server 120a is used to store the company's messaging data, then a first employee of the company may be able to see the availability of another employee. Servers 120 may be able to communicate with one another and/or with any components within their respective site. For example, server 120*b* may be able to communicate with server 120*a* and any of the components within site 100*b*. The information stored within servers 120 and their ability to communicate with other components may be used to help facilitate scheduling a conference.

Conference coordinators 130 may be any combination of hardware, software, and/or encoded logic operable to provide, either alone or in combination with other components of site 100, one touch conference initiation. In particular embodiments, conference coordinator 130*a* may coordinate conference details with conference coordinator 130*b*. In certain scenarios the details may be encrypted. Once the details have been coordinated, conference coordinator 130*a* may then push or publish any information regarding the conference needed by any of the components of site 100*a*. For example, conference coordinator 130*a* may provide a phone within conference room 150*a* with the phone numbers that may be needed for the conference (e.g., the phone number of the phone in conference room 150*b*). The phone may then become a conference initiator because with the push of a single button the user may be able to initiate the conference. Conference coordinator 130*a* may also send information to other conference room components (e.g., a display device, a video camera, etc.) or provide additional information to the IP phone for the IP phone to transmit to the other components within the conference room. Thus, once the user enters the conference she may simply press a single button on the conference initiator and all the equipment needed for the conference may be activated and become ready for use. For example, upon pressing the single button, the monitors may be ready to receive a video signal from the remote participants. Conference coordinator 130*a* may also publish information for presentation to the participants if, for example, there has been a change to the conference (e.g., the attendees from site 100*b* can not participate at the requested time); thus alerting the participants of the change.

Networks 140 may comprise any desired communication equipment, including hardware and any appropriate controlling logic, for interconnecting sites 100 and any appropriate components of sites 100. Thus, networks 140 may facilitate communication between and within sites 100. Networks 140 may include local area networks (LANs), metropolitan area networks (MANs), wide area networks (WANs), any other public or private networks, local, regional, or global communication networks, enterprise intranets, other suitable wireline or wireless communication links, or any combination of the preceding. Networks 140 may include any combination of gateways, routers, hubs, switches, access points, base stations, and any other hardware, software, or a combination of the preceding that may implement any suitable protocol or communication.

Conference rooms 150 may include any room containing equipment that may be used in conducting or participating in a conference. The conference may include, audio, video and/or other multimedia content. For example, conference room 150*b* may include speakers, microphones, speakerphones, cameras, video displays, and/or computers. Conference rooms 150 may also include conference initiators which may allow a user to initiate a conference with the other participants by simply pressing a button. The button may be a dedicated button designed solely to initiate scheduled conferences, a soft-button appearing only when a conference is available, or any other suitable control for receiving user input. Depending on the embodiment the conference initiator may be a dedicated device used solely for initiating conferences or it may be a multi-functional device where initiating a scheduled conference is just one of the features of the device. For example, in some embodiments, the conference initiator may be an IP phone which may provide any of the functionality commonly provided by phones (e.g., placing and/or receiving calls) in addition to allowing one-button conference initiation. When a conference is to take place in the conference room containing the IP phone, conference coordinator 130 may push certain details regarding the conference to the IP phone. Using these details the IP phone may present a soft-button for the user to use to initiate the conference.

Using this process, separately managed networks, such as separate enterprise networks, can exchange information regarding scheduling of conferences to support functions such as one-button-to-push conference launch.

Modifications, additions, or omissions may be made to system 10. For example, system 10 may include any suitable number of sites 100 and may facilitate conferences in any number of conference rooms 150. As yet another example, the visual conference between sites 100 may be point-to-point conferences or multipoint conferences. Moreover, the operations of system 10 may be performed by more, fewer, or other components. Additionally, system 10 may comprise managed service offerings for specific types of conference scheduling. Furthermore, operations of system 10 may be performed using any suitable logic.

Figure 2:
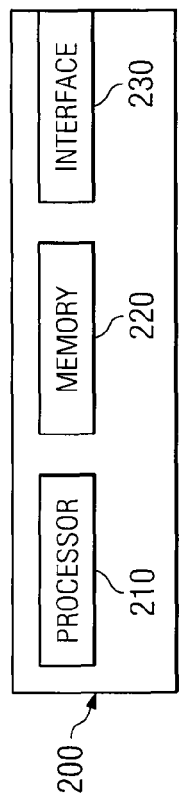
FIG. 2 is a detailed block diagram of the conference coordinator depicted in FIG. 1, in accordance with some embodiments.

FIG. 2 is a detailed block diagram of the conference coordinator depicted in FIG. 1, in accordance with particular embodiments. Conference coordinator 200 comprises processor 210, memory 220, and interface 230. These components may work together to allow conference coordinator 200 to coordinate conference details with remote conference coordinators and to push any necessary details to the proper component(s) (e.g., a conference initiator such as an IP phone) within the appropriate conference room. While conference coordinator 200 is depicted as a single stand alone device, in particular embodiments it may be incorporated into other devices and/or its components may be spread out through a network or site, such as network 140*a* or site 100*a*.

Processor 210 may be a microprocessor, controller, or any other suitable computing device, resource, or combination of hardware, software and/or encoded logic operable to provide, either alone or in conjunction with other conference coordinator 200 components (e.g., memory 220) conference coordinator functionality. Such functionality may include providing various features discussed herein to a user. One feature that certain embodiments may provide may include determining the details of a particular conference and transmitting enough of the details to an appropriate device (e.g., a device, such as an IP phone that is operable to initiate the conference) within the scheduled conference room. In determining the details of a particular conference, processor 210 may need to take into account information such as the number of participants of the conference, the general location of the participants, the technology needed for the conference (e.g., video, voice, data, slideshow, etc.), the capabilities of any remote participants, and any other factors or information that may be desirable.

Memory 220 may be any form of volatile or non-volatile memory including, without limitation, magnetic media, optical media, random access memory (RAM), read-only memory (ROM), removable media, or any other suitable local or remote memory component. Memory 220 may store any suitable data or information, including software and encoded logic, utilized by conference coordinator 200. For example, memory 220 may maintain a listing, table, or other organization of information about various conference rooms that includes the equipment, technology and/or features supported by each conference room. This information may be used by processor 210 in determining which conference room to use for a particular conference. For example, memory 220 may store the seating capacity of all the conference rooms at a particular site. Upon receiving a request for a conference with ten participants, processor 210 may compare the room capacities stored in memory 220 to locate a conference room able to accommodate ten participants. As another example, memory 220 may store a chart of any upcoming conferences, including which room is to be used, what time the conference is to start, and how long the conference is expected to last. In particular embodiments, memory 220 may store a tCard for each scheduled conference, remote entity or conference coordinator. The tCard may be similar to a vCard; it may store all, or some portion of, the information regarding the conference (e.g., the phone numbers to be used, the network segments to be used, the latency, the time zones of the participants, an optimal call route, the types, characteristics, and features of the endpoints involved, the features of the conference rooms and/or the type of equipment available). The information contained within the tCard may be built up by the respective conference coordinators as they synchronize the details for the conference. In particular embodiments the tCard may be encrypted.

Interface 230 may comprise any hardware, software, or encoded logic needed to be able to send and receive information with other components, such as a calendar server or other conference coordinators. For example, interface 230 may receive an email from an exchange server containing information regarding an upcoming conference. As another example, interface 230 may transmit a tCard to a remote conference coordinator to begin the synchronization of the conference details.

The following example may help illustrate how the components of conference coordinator 200 may interact to provide some of the features and benefits of particular embodiments. In this example assume that a user (hereinafter the scheduler) works for Host Company and wishes to set up a conference with some employees of Client Company to pitch a product. It may also be assumed that Host Company and Client Company are operating different enterprise networks, or that a company is offering managed services across enterprises. For purposes of this example assume that the scheduler is using a calendaring program that interacts with an exchange server. Using his calendaring program the scheduler has identified the ten participants he wants involved in the conference; of the ten participants seven participants work locally for Host Company and three participants work for Client Company.

Upon the scheduler entering the conference details using his calendaring program, the calendaring program may transmit the conference details, including an identification of each of the desired participants, to Host Company's exchange server. Host Company's exchange server may send a meeting invite to the exchange server of Client Company.

Conference coordinator 200 may become aware of the upcoming conference through a variety of different techniques and/or protocols. For example, in some embodiments, interface 230 may periodically poll the exchange server; conference coordinator 200 may be alerted at the next sweep after the exchange server indicates there is an update. As another example, conference coordinator 200 may have previously registered to receive a notification from the exchange server whenever a conference is scheduled. Yet another example may be for the exchange server to send an email to conference coordinator 200 containing the details, or a portion thereof, regarding the conference.

Regardless of how conference coordinator 200 is alerted, processor 210 may be able to extract and/or abstract details regarding the conference from the information provided to conference coordinator 200. For example, processor 210 may be able to extract the number of participants and their respective email addresses. From the email addresses of the three participants from Client Company, processor 210 may be able to abstract the domain address associated with Client Company's conference coordinator. The meeting details may also include information indicative of the number and/or type of local screens/monitors that may be needed. For example, because there are three participants from Client Company it may be desirable to host the conference from a conference room that has three video monitors. If the details indicate that a slide show or hand-written notes are to be used then processor 210 may search the capabilities of the conference rooms stored within memory 220 to identify conference rooms that include additional monitors or document cameras/screens. The conference details may also include the time of the conference and the respective time zone(s) of the participants. The time zone may be extracted from data in the notification or it may be abstracted from the location of the participants or Client Company.

Processor 210 may also determine the capabilities and features of the conference room. For example, whether or not the conference room includes a document screen, how many and/or what type (e.g., high-definition or standard-definition) of cameras are in the conference room, how many screens are in the conference room, or any other feature, aspect, capability or technology that may be relevant or desirable to communicate to Client Company's conference coordinator. The relevant information may then be transmitted to Client Company's conference coordinator. In some embodiments, this may be done using an email addressed to Client Company's conference coordinator. Processor 210 may be able to determine the email address for Client Company's conference coordinator from the domain address it abstracted earlier from the email addresses of the conference participants. More specifically, in some embodiments conference coordinators may have a common name (e.g., superuser) that may be combined with the respective domain for the particular entity. Thus, if the three Client Company participants have the following email addresses, Joe@client.com, Mike@client.com and Sarah@client.com then processor 210 may be able to determine that client.com is the domain address for Client Company. Thus the email to Client Company's conference coordinator may have the following address superuser@client.com. In particular embodiments the details transferred between conference coordinators may be encrypted.

Client Company's conference coordinator may receive the meeting details and perform its own analysis of the details to determine which of Client Company's conference rooms is best suited for the conference and what the capabilities are for this conference room. In particular embodiments Client Company's conference coordinator may also check the availability of the three participants to determine if they will be able to participate in the conference. This information may then be communicated to conference coordinator 200.

Interface 230 may receive the information from Client Company's conference coordinator and provide it to processor 210. Processor 210 may then review and possibly modify the details of the conference. For example, if the details sent by Client Company's conference coordinator indicate that the conference room to be used by Client Company only has two cameras then processor 210 may determine that a conference room with three monitors is not needed and that a conference room with two monitors would be better. Processor 210 may synchronize the conference details provided by Client Company's conference coordinator with its own conference details. Once synchronized, interface 230 may transmit the conference details, or a portion thereof, to a conference initiator within the conference room to be used for the conference. The conference initiator may be any device operable to initiate a conference, such as an IP phone. Included in the conference details sent to the conference initiator may be the phone number to be used for the conference and the details of how any additional equipment is to be configured for the conference. The phone number for the conference may be the number of a phone within Client Company's conference room or it may be a call-in number for the conference. In some situations, such as where a call-in number is used, a conference ID and/or password may be needed. This information may be transmitted to the conference initiator to allow the conference initiator to either enter the appropriate log-in information itself or to present it to the local conference participants to allow them to enter it.

Modifications, additions, or omissions may be made in how conference coordinator 200 synchronizes a conference and pushes the details to the conference initiator. For example, conference coordinator 200 and Client Company's conference coordinator may have exchanged tCards in synchronizing the details of the conference.

Figure 3:
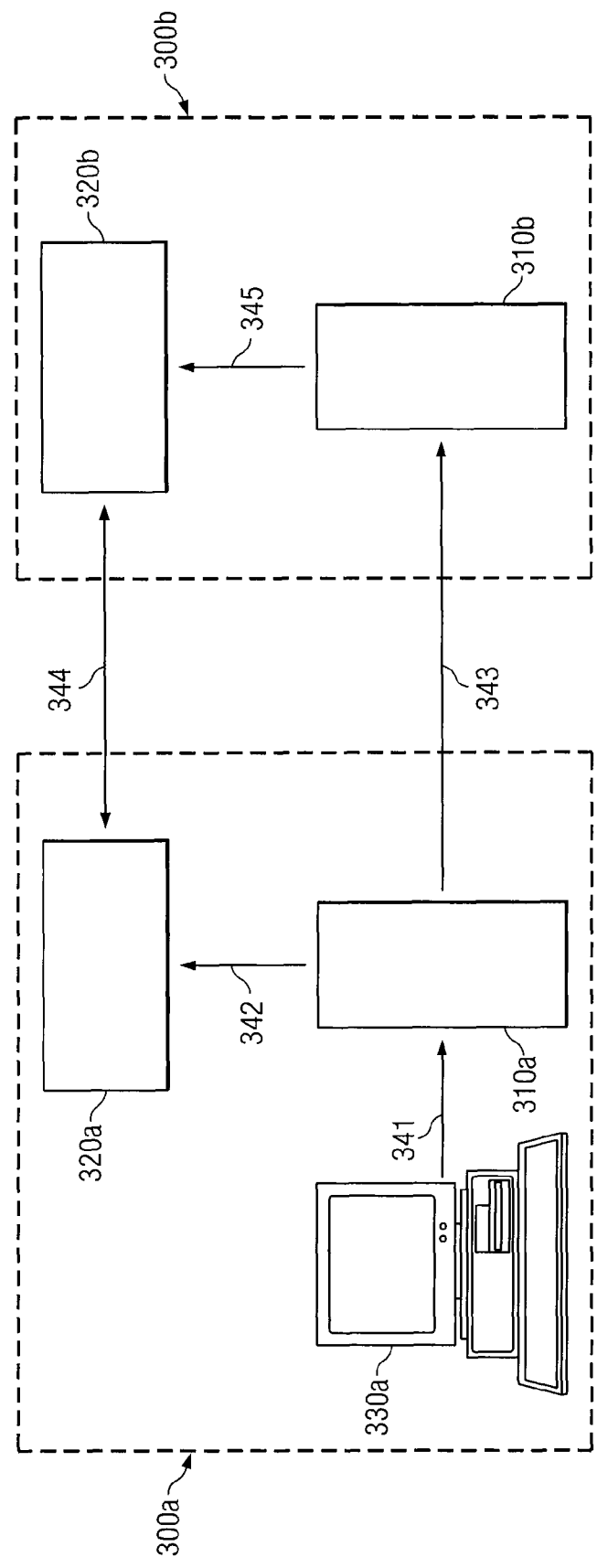
FIG. 3 is a block diagram illustrating an exchange of communications between and within two remote enterprise networks, in accordance with some embodiments.

FIG. 3 is a block diagram illustrating an exchange of communications between and within two remote enterprise networks, in accordance with some embodiments. In the depicted embodiment, enterprise network 300*a* includes server 310*a*, conference coordinator 320*a*, and scheduler 330*a*; enterprise network 300*b* includes server 310*b* and conference coordinator 320*b*. Enterprises 300 may also include any additional hardware, software and encoded logic that may be used to facilitate in the transmission and/or relay of communications 341-345.

Because the following description of FIG. 3 is based on a particular embodiment it should be understood that different embodiments may use different types of devices and communications and the devices may be arranged differently and the communications may be transmitted in a different order. Furthermore, the numbering of communications 341-345 is merely for purposes of identifying specific communications and is not intended to suggest the timing or order in which the communications may be transmitted and/or received.

For purposes of this example, assume that enterprise 300*a* has configured conference coordinator 320*a* to periodically poll server 310*a* to determine if any new conferences have been scheduled. Also assume that enterprise network 300*a* belongs to a first company and that enterprise network 300*b* belongs to a second company. It may also be assumed that enterprise networks 300 are separate enterprise networks operated by different entities.

Using the above assumptions, a sample exchange of communications may begin with a user scheduling a conference from scheduler 330*a*. The user may enter any of a variety of information used to identify the participants and particulars of a conference. For example, a user may select the participants for the conference from a list of contacts available within his calendaring program. He may also be able to indicate that the conference is to be a video conference with a slideshow. Upon the user finishing the scheduling of the conference, communication 341 may be sent from scheduler 330*a* to server 310*a*. Communication 341 may contain the scheduling information entered by the user.

Communication 342 may provide conference coordinator 320*a* with all or some of the information received by server 310*a*. This may be done the next time conference coordinator 320*a* polls server 310*a*. Some of the details communication 342 may contain include what the user wants to do during the conference (e.g., present a slideshow, use a document screen), when the conference is to begin, and who will be participating. The information may be explicitly contained in communication 341 or it may be abstracted from other information within communication 341.

Communication 343 may be a meeting invite sent from server 310*a* to server 310*b*. Communication 343 may include any information needed to allow server 310*b* to schedule the conference on the calendars of the indicated participants. For example, the meeting invite may include the participants and the scheduled time of the conference. Thus, when a user from enterprise 300*b* uses his calendaring software, the scheduled conference may show up on his calendar.

Communication 344 may involve an exchange of encrypted messages in which conference coordinators 320 exchange information regarding the rooms, and their features/capabilities, to be used for the conference. For example, communication 344 from conference coordinator 320*a* may include a phone number associated with a phone within the conference room to be used by enterprise 300*a* for the scheduled conference. In some embodiments this information may be passed using a tCard as described above.

Communication 345 may be similar to communication 342. Thus, conference coordinator 320*a* and 320*b* both know who will be attending the conference, both locally and from the other enterprise, what conference features or capabilities will be used, where the conference will be held (e.g., which conference room) and for what time the conference is scheduled.

Figure 4:
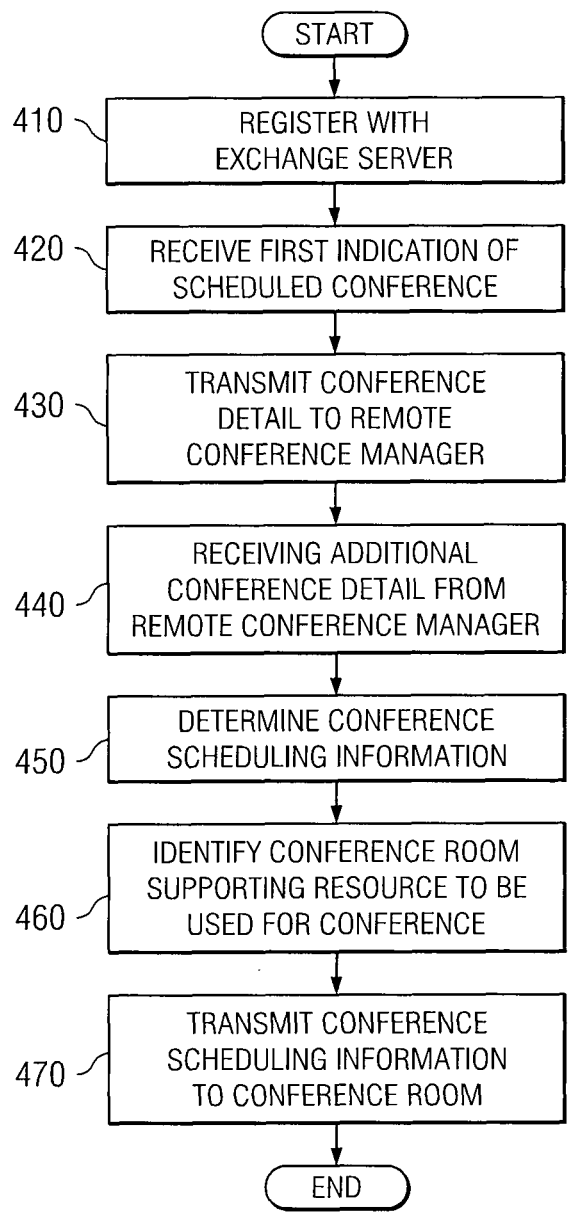
FIG. 4 is a flowchart illustrating a method for initiating a conference with one button push, in accordance with some embodiments.

FIG. 4 is a flowchart illustrating a method for initiating a conference with one button push, in accordance with some embodiments. This flowchart depicts the steps involved in particular embodiments, other embodiments may involve additional, fewer, or different steps. It is not intended that the depicted flowchart include an exhaustive list of the steps, and their respective variations, covering all embodiments. For purposes of this flowchart it is assumed that a first user of a first enterprise wishes to schedule a conference with users from the first enterprise and a second enterprise.

The method begins at step 410 in which a conference coordinator registers with an exchange server. In some embodiments, the conference coordinator may register as a "super user." That is, from the perspective of the exchange server, the conference coordinator is a user who is not a normal user. As a "super user" the conference coordinator may receive an event message whenever a conference is scheduled, even if the scheduler did not specify the conference coordinator as a participant. In some embodiments, the conference coordinator may have its own identification associated therewith. The identification may comprise a common or generic name coupled with the domain of the enterprise (e.g., superuser@firstenterprise.com). Thus, the conference coordinators may be able to determine the email address of other enterprises' conference coordinators by simply knowing the email address of a participant from that enterprise.

At step 420 the conference coordinator receives a first indication of a scheduled conference. In some embodiments this may involve the exchange server sending the conference coordinator an email comprising details regarding the scheduled conference. This email may be addressed to "superuser@firstenterprise.com." As discussed above, this may be a common name joined with the domain of the respective enterprise.

At step 430 conference details are transmitted to a remote conference coordinator. The remote conference coordinator may be operated by the second enterprise. The conference details may include information regarding devices and features of one or more conference rooms that may be used for the conference. For example, the conference details may specify that the conference room has three cameras and three monitors, that it has a document screen, and that it does not have a secondary monitor for displaying slideshows. In particular embodiments this information may be encrypted and/or sent to superuser@secondenterprise.com.

At step 440 additional conference details are received from the remote conference coordinator. The additional conference details received at step 440 may be similar to those sent at step 430 only they may provide details regarding the features and capabilities of the second enterprise. For example, the remote conference coordinator may send additional conference details indicating that its conference room has three cameras and three monitors, that it does not have a document camera, and that it does not have a secondary monitor for displaying slideshows. In some embodiments, steps 430 and 440 may be repeated multiple times as the conference coordinators attempt to determine conference scheduling information that best matches the capabilities and availability of the rooms with the needs of the scheduled conference.

At step 450 conference scheduling information is determined. This may be based on information contained in the indication of the scheduled conference received at step 420, and the additional conference details provided by the remote conference coordinator at step 440. This may reflect the result of determining what conference rooms (local and remote) best match the functionality requested by the user.

At steps 460 and 470 a conference room supporting the resources needed for the conference is identified and the scheduling information is transmitted thereto. The information transmitted to the conference room may be received by a user interface used to initiate the conference. The information may allow the user interface to present the user with a single button to initiate the conference. Thus, upon the user entering the scheduled conference room, they simply press the one button to initiate the conference and the conference begins. More specifically, as an example, once the user presses the button the monitors in the conference room will be set up to display the video signals from the second enterprises cameras, the cameras will be set up to transmit video to the second enterprise's monitors, and the speaker and microphone will be set up to receive and send sound from the second enterprise's microphone and speaker, respectively. This may be enabled by the exchange of information that takes place between the first and second enterprises' conference coordinators. As may be apparent this allows for rather sophisticated conferences to be set up without a specially trained conference technician getting involved.

Modifications, additions, or omissions may be made to the method depicted in FIG. 4. The flowchart may include more, fewer, or other steps. For example, the conference coordinator may seek permission from the scheduler to change one or more capabilities of the scheduled conference. As another example, conference coordinator may poll the exchange server to determine if a conference has been scheduled. Additionally, steps may be performed in any suitable order and by any suitable component.

Although particular embodiments have been described, a myriad of changes, variations, alterations, transformations, modifications, and alternate embodiments may be suggested to one skilled in the art, and it is intended that particular embodiments encompass such changes, variations, alterations, transformations, and modifications as falling within the scope of the appended claims.

Certain embodiments may include none, some, or all of the above technical advantages. One or more other technical advantages may be readily apparent to one skilled in the art from the figures, descriptions, and claims included herein.

What is claimed is:

1. A method comprising:
receiving at a local conference coordinator a first indication of a scheduled conference comprising a plurality of conference details, the local conference coordinator implemented via a processor;
transmitting, by the local conference coordinator, at least one of the plurality of conference details to a remote conference coordinator;
receiving, at the local conference coordinator, at least one additional conference detail regarding the scheduled conference from the remote conference coordinator;
determining, by the local conference coordinator, conference scheduling information comprising at least one piece of equipment to be used for the scheduled conference based on the plurality of conference details and the at least one additional conference detail;
determining, by the local conference coordinator based on the received conference details and the at least one additional conference detail, a conference room supporting the at least one piece of equipment to be used for the scheduled conference, wherein the plurality of conference details comprises an email address for each participant in the conference;
transmitting at least one of the plurality of conference details to the remote conference coordinator comprises, upon determining that at least one email address of at least one participant comprises a remote domain that does not match a local domain of the local conference coordinator, generating and transmitting an email comprising the at least one of the plurality of conference details and an address based on the remote domain address; and
transmitting conference scheduling information to the conference room such that a user interface in the conference room can initiate the scheduled conference based on a single indication received from a user.

2. The method of claim 1, wherein the user interface is an internet protocol phone comprising a soft-button enabling one-button launch of the scheduled conference.

3. The method of claim 1, wherein receiving a first indication of a conference comprising a plurality of conference details comprises receiving a list of participants and an email address associated with each participant from a calendar server.

4. The method of claim 1, wherein determining conference scheduling information comprises determining at least one capability supported by a first participating device within the conference room and a second participating device within a remote conference room.

5. The method of claim 1, further comprising registering with an exchange server to receive a notification upon the calendar server receiving a request to schedule a conference.

6. The method of claim 1, further comprising polling a calendar server to determine if the calendar server has received a request to schedule a conference.

7. The method of claim 1, further comprising receiving an email from an exchange server, the email comprising the first indication of the scheduled conference.

8. The method of claim 1, wherein a conference detail comprises a detail selected from the group consisting of a phone number, a number of screens, a type of screen, a time zone, a location, a capability of an endpoint, a type of an endpoint, and a tCard.

9. A system comprising:
an interface operable to:
receive at a local conference coordinator a first indication of a scheduled conference comprising a plurality of conference details;
transmit at least one of the plurality of conference details to a remote conference coordinator; and receive at least one additional conference detail regarding the scheduled conference from the remote conference coordinator; and
a processor coupled to the interface and operable to:
determine conference scheduling information comprising at least one piece of equipment to be used for the scheduled conference based on the plurality of conference details and the at least one additional conference detail; and
determine, based on the received conference details and the at least one additional conference detail, a conference room supporting the at least one piece of equipment to be used for the scheduled conference, wherein the plurality of conference details comprises an email address for each participant in the conference;
the interface is operable to transmit at least one of the plurality of conference details to the remote conference coordinator comprises an interface operable to, upon determining that at least one email address of at least one participant comprises a remote domain that does not match a local domain of the local conference coordinator, generate and transmit an email comprising the at least one of the plurality of conference details and an address based on the remote domain address; and
wherein the interface is further operable to transmit conference scheduling information to the conference room such that a user interface in the conference room can initiate the scheduled conference based on a single indication received from a user.

10. The system of claim 9, wherein the user interface is an internet protocol phone comprising a soft-button enabling one-button launch of the scheduled conference.

11. The system of claim 9, wherein the interface operable to receive a first indication of a conference comprising a plurality of conference details comprises an interface operable to receive a list of participants and an email address associated with each participant from a calendar server.

12. The system of claim 9, wherein the processor operable to determine conference scheduling information comprises a processor operable to determine at least one capability supported by a first participating device within the conference room and a second participating device within a remote conference room.

13. The system of claim 9, wherein the interface is further operable to register with a calendar server to receive a notification upon the calendar server receiving a request to schedule a conference.

14. The system of claim 9, wherein the interface is further operable to poll a calendar server to determine if the calendar server has received a request to schedule a conference.

15. The system of claim 9, wherein the interface is further operable to receive an email from an exchange server, the email comprising the first indication of the scheduled conference.

16. The system of claim 9, wherein a conference detail comprises a detail selected from the group consisting of a phone number, a number of screens, a type of screen, a time zone, a location, a capability of an endpoint, a type of an endpoint, and a tCard.

17. A system comprising: means for receiving at a local conference coordinator a first indication of a scheduled conference comprising a plurality of conference details;
means for transmitting at least one of the plurality of conference details to a remote conference coordinator;
means for receiving at least one additional conference detail regarding the scheduled conference from the remote conference coordinator;
means for determining conference scheduling information comprising at least one piece of equipment to be used for the scheduled conference based on the plurality of conference details and the at least one additional conference detail;
means for determining, based on the received conference details and the at least one additional conference detail, a conference room supporting the at least one piece of equipment to be used for the scheduled conference, wherein the plurality of conference details comprises an email address for each participant in the conference;
means for transmitting at least one of the plurality of conference details to the remote conference coordinator comprises, upon determining that at least one email address of at least one participant comprises a remote domain that does not match a local domain of the local conference coordinator, generating and transmitting an email comprising the at least one of the plurality of conference details and an address based on the remote domain address; and
means for transmitting conference scheduling information to the conference room such that a user interface in the conference room can initiate the scheduled conference based on a single indication received from a user.

* * * * *